United States Patent [19]
Andersson

[11] 3,960,180
[45] June 1, 1976

[54] PROTECTION COVER FOR PIPE BENDS

[75] Inventor: Frans Gunnar Seved Andersson, Djarved, Sweden

[73] Assignee: Aktiebolaget M. Anderssons Isolering, Ornskoldsvik, Sweden

[22] Filed: Jan. 14, 1974

[21] Appl. No.: 433,302

[30] Foreign Application Priority Data

Mar. 1, 1973 Sweden............................ 7302888

[52] U.S. Cl.............................. 138/110; 138/149; 138/178
[51] Int. Cl.² ........................................ F16L 57/00
[58] Field of Search ...... 138/110, 140, 156, DIG. 8, 138/177, 178, 149, 103, 128

[56] References Cited

UNITED STATES PATENTS

| | | | |
|---|---|---|---|
| 1,683,023 | 9/1928 | Champion...................... | 138/110 X |
| 2,700,988 | 2/1955 | Smisks........................... | 138/110 X |
| 3,495,629 | 2/1970 | Botsolas et al................ | 138/178 X |
| 3,578,026 | 5/1971 | Meyer, Jr....................... | 138/110 |
| 3,732,894 | 5/1973 | Botsolas........................ | 138/110 X |

FOREIGN PATENTS OR APPLICATIONS

| | | | |
|---|---|---|---|
| 2,107,150 | 10/1972 | Germany...................... | 138/178 X |

*Primary Examiner*—Richard C. Queisser
*Assistant Examiner*—Charles Gorenstein
*Attorney, Agent, or Firm*—Larson, Taylor & Hinds

[57] ABSTRACT

A protection cover for pipe bends produced from a plastic material by deep drawing into a shape which is similar to the shape which could be obtained if an integral and complete cover installed on a pipe bend had been cut along the interior generatrics line of the pipe bend and spread apart and opened up. The shape of the present protection cover is further modified by having a cup-shaped part generally elongated and rounded in transverse cross-section and having integral therewith tail sections located at each short side of the cup-shaped part. Each of the tail sections have a concave bend therein. The overall shape of the protection cover is such that when the cover is applied over an insulated pipe bend, the cover will have on its interior side a curvature radius that is essentially greater than the curvature radius of its exterior side, and the two curvature radii will have mutually different centers.

5 Claims, 10 Drawing Figures

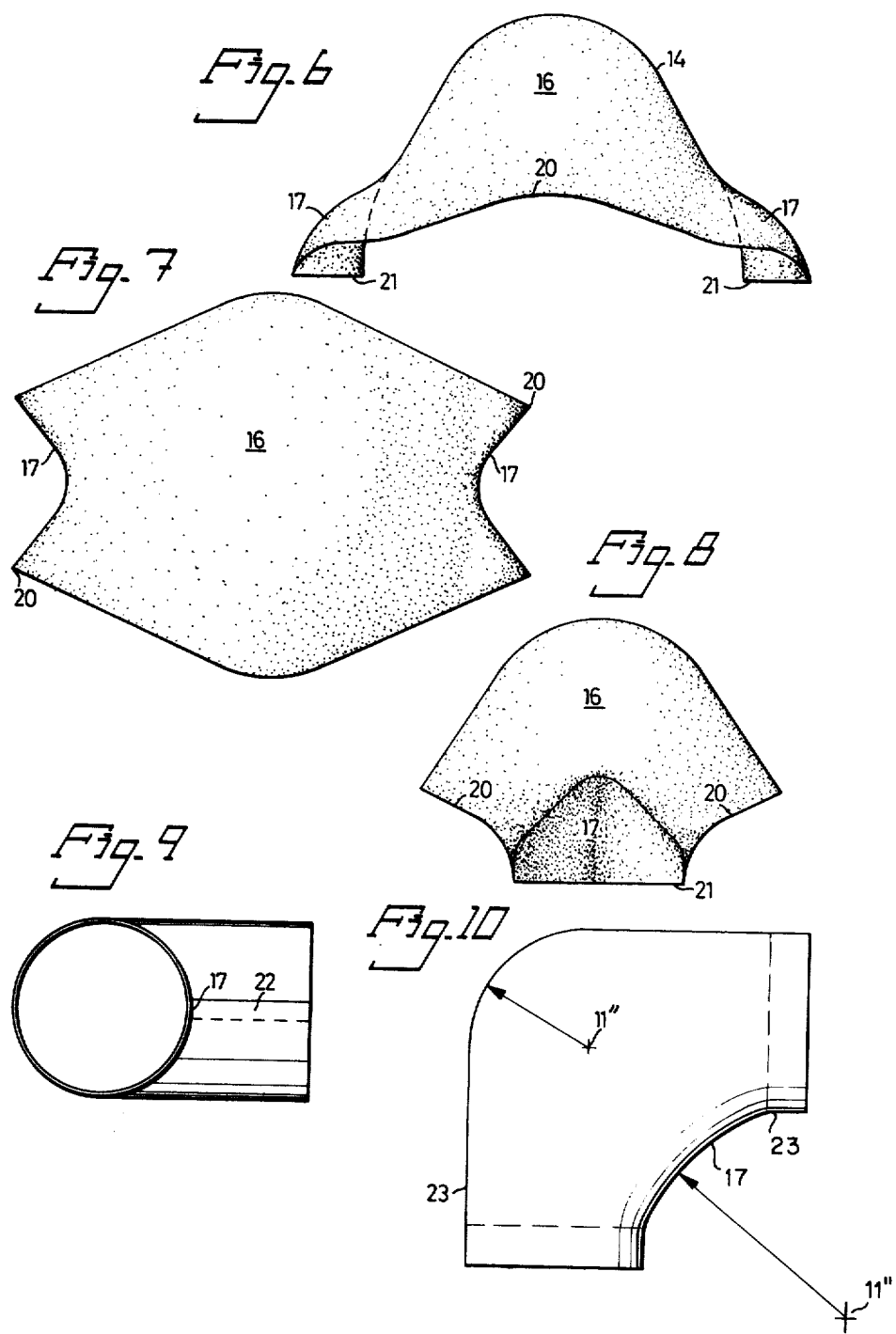

PROTECTION COVER FOR PIPE BENDS

BACKGROUND OF THE INVENTION

The present invention refers to a protection cover for pipe bends produced from plastic by deep drawing and shaped by deformation to generally the shape obtained by cutting a comprehensive or complete isolation cover installed on a pipe bend along the interior generatrics line and bending apart and separating the two edges created by the cutting.

Such a protection cover when in a position of rest and before the cover is installed on a pipe bend resiliently maintains its shape which can be described as follows. The cover contains an elongated, cup-formed part, rounded in cross-section across the longitudinal direction and has a diameter that is essentially less than the outer generatrics diameter of the pipe bend. The cover further has at each short side a tail section or a part formed like a spiss gatt, but having the ends thereof bent inwardly; a spiss gatt being a canoe-shaped river dingy. The sides have an edge length such that when the protection cover is extended around a pipe bend, the diametrical plane or the transverse diameter of the cup-shaped part in the direction of the curvature plane of the pipe bend, the tail section or spiss gatt formed part will, under resilient or snap action, be drawn out to an edge line that is superimposed on the fictive cutting line along the interior generatrics line of the pipe bend mentioned above. The free edges of the aforedescribed pipe cover are thereby comprehensive and, in a position of rest before the cover is applied to a pipe bend, are positioned in the same level or plane.

The reason for wanting to apply such protection covers over pipe bends is that the pipes often contain either a very cold or a very hot flowing medium or fluid. Thus, the pipes must be insulated to prevent heat exchange with the surrounding environment so that the temperature of the fluid does not change. It has been customary to insulate pipes with some means of insulation material which usually has the shape of a pipe shell. The pipe shell may be made from mineral wool, or from expanded plastic, or from any other good insulation means. All of these insulation means, however, are strongly sensitive to exterior influence, such as susceptibility to damage.

Very often, these type pipes run along the roof or along the walls of narrow spaces, such as are found in basement passes, heater rooms, corridors, passages in vessels, and so forth. However, insulation applied to conduits and pipes in these type places is easily damaged, especially if heavy or clumsy objects are transported therethrough. For this reason, it is customary to surround the insulation with a protection cover of plastic or sheet metal.

Such protection covers may easily be applied on straight pipe parts, but there has been some difficulty in covering the pipe bends. For that reason, it has been proposed to use deep drawn protection covers as mentioned above.

For practical reasons, when deep drawing, it is normal to start from an even or uniform disc of plastic material from which the deep drawn object is produced. Consequently, the deep drawn object must be placed over an even frame, inside of which is a cavity and which is either subjected to air under pressure on one side of the plastic disc, or subjected to vacuum on the other side of the plastic disc. Thus, after the plastic disc has been heated to a plastic state and a differential in pressure is applied, the plastic disc is re-shaped to conform to the shape of the inner side of the frame's cavity. The consequence of this is that all deep drawn objects will be positioned with their upper comprehensive free ends in a single plane; that is, the plane in which one initially applied the plastic disc. If a protection cover for a pipe bend is arranged so that the free edge of the protection cover is comprehensive in the position of rest of the insulation cover in a single plane, one will avoid the necessity of cutting the work clean during the production of the protection cover. Although it is possible to do this, the protection covers formed thereby can only be used or adapted for a single pipe bend of a given dimension. The dimension of the pipe bend produced as described above is determined by the exterior diameter of the pipe proper and also by the bend radius of the pipe bend.

In practice in order to mount pipes in configurations based on the pipe run, it is necessary for each separate dimension of pipe to have pipe bends of different types, mutually separated by different curvature radius. If all of the pipe bend shapes are to be covered by a single pipe shell and a protection cover, then such a large assortment of protection covers is required that it is uneconomical to maintain and store a sufficient supply of each type.

SUMMARY OF THE INVENTION

The present invention is based upon a technical investigation of the possibility of creating the aforementioned type of protection covers, which when in a position of rest before being applied to the pipe bend are coil-formed or resilient, and when not yet applied on a pipe bend, contain an elongated, cup-formed part, rounded in transverse cross-section. The cover is provided at each short side with a spiss gatt shaped part or tail section having a concave bend therein (i.e., the pointed ends bent inwardly) and having an edge length such that when the insulation cover is extended around a pipe bend with the transverse plane of the cover perpendicular to the curvature plane of the pipe bend (i.e., with the diametrical plane of the cover's rounded part in the direction of the curvature plane of the pipe bend), the tail section formed part will under resilient snap action be extended to an edge line that is superimposed with the fictive cutting up line located along the interior generatrics line of the pipe bend. This technical investigation also referred to the question of producing such a pipe cover that would be used for pipe bends of a plurality of different shapes. The results proved that one could provide a protection cover for pipe bends having the same pipe dimension, but with different curvature radii.

The investigation also proved that such a protection cover could not be made in such a way that the free, comprehensive edges of the protection cover would, when in the position of rest of the protection cover, be situated in one single level or plane. Consequently, a separate working operation is necessary to cut clean and remove the upper edge, which makes the edge concave with respect to the aforementioned plane, in order that a protection cover of the above indicated pipe or character shall be possible to be used for pipe bends of different curvature radius.

Thus, a question about the economical justification of the aforementioned cutting operation has been raised. The question is whether the storing costs and the inventory costs for maintaining a large number of protection covers is so great that the costs are greater than the costs for the cutting operation of the protection covers in accordance with the present invention whereby a smaller number of pipes are needed for pipe bends with the same pipe diameter but with mutually different curvature radius. It is this economical problem which has been the motivating basis of the present invention.

The results of the investigation have proven it technically as well as economically possible to produce protection covers for pipe bends in the above indicated way.

The present invention thus refers to an elongate protection cover for pipe bends, each such pipe bend defining a curvature plane and having an exterior side and an interior side. The cover is comprised of a deformable material that has been deep drawn into a shape which is similar to the shape which could be obtained if an integral and complete cover installed on a pipe bend had been cut along the interior generatrics line of the pipe bend and spread apart and opened up. In a position of rest before being installed on a pipe bend, the cover has longitudinal and transverse planes of symmetry and comprises a cup-shaped portion elongated along the longitudinal plane of the cover and having long sides and short sides, the cup-shaped part also being rounded in transverse cross-section. A tail section is located at each short side of the cup-shaped part, each tail section having a concave bend therein. The concave bend is such that when the cover is applied to a pipe bend with the longitudinal plane of the cover perpendicular to the curvature plane of the pipe bend, each tail section can be folded at least to an edge line located along the interior generatrics line of the pipe bend. The cup-shaped part has a first curvature radius in a transverse direction determining the curvature of the cover when applied to a pipe bend on the exterior side of the pipe bend. The cover further has, when applied to a pipe bend, a second curvature radius determining the curvature of the cover on the interior side of the pipe bend. The first and second radii respectively have first and second mutually different centers, the first center being located closer to the exterior side of the pipe bend than the second center and the second curvature radius being greater than the first curvature radius. The two tail sections further have, before the cover is applied to a pipe bend, the free edges thereof in the same plane, this plane being perpendicular to both the transverse and longitudinal planes of the cover. The connecting edges connecting the two tail sections and defining the lower edge of the long side of the cup-shaped part is curved upward and above the same plane defined by the free edges of the tail sections.

The invention will be further described below in connection with a form of execution or specific embodiment, shown in the attached drawings, but it is understood that the invention is not limited to this specific embodiment, but that essential modifications may occur within the frame of the invention.

BRIEF DESCRIPTION OF THE DRAWINGS

In the drawings.

FIG. 3 thereby shows the protection cover in its position of rest in a side elevational view perpendicularly to the longitudinal direction of the cover.

FIG. 4 shows the protection cover from above in a plan view, and FIG. 5 shows the protection cover in a crossward or transverse direction in a side elevational view.

FIGS. 6, 7 and 8 correspond to FIGS. 3, 4 and 5, respectively, and show the protection cover after the cover has been cut clean in a cutting operation.

FIGS. 9 and 10, finally, show the protection cover in two different directions in elevational views perpendicular to each other, such as the protection cover appears after it has, under snap action, been applied over a pipe bend. Thereby, it should be observed that FIGS. 3–10 are made in one and the same scale.

DESCRIPTION OF THE PREFERRED EMBODIMENT

Figure 1:
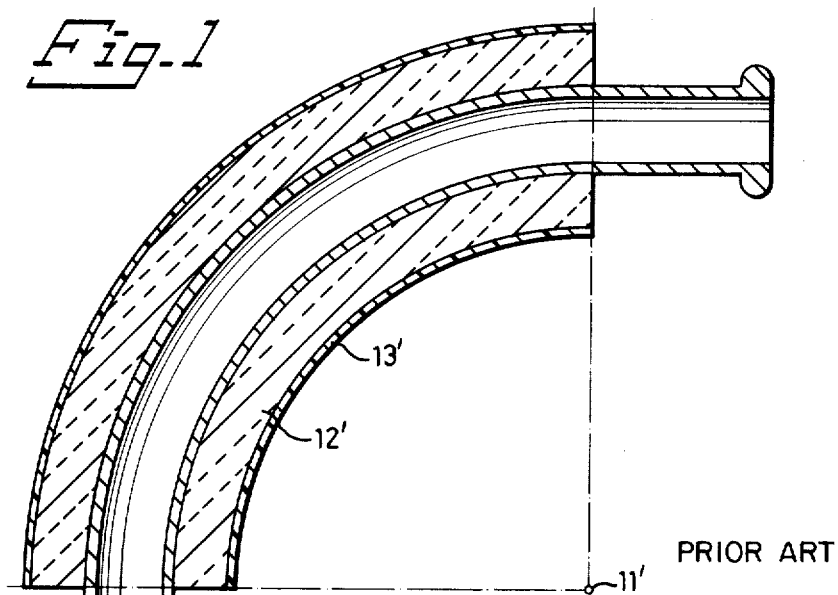
FIG. 1 and FIG. 2 show a couple of different insulated pipe bends provided with pipe bend protection covers according to the prior art.
Figure 2:
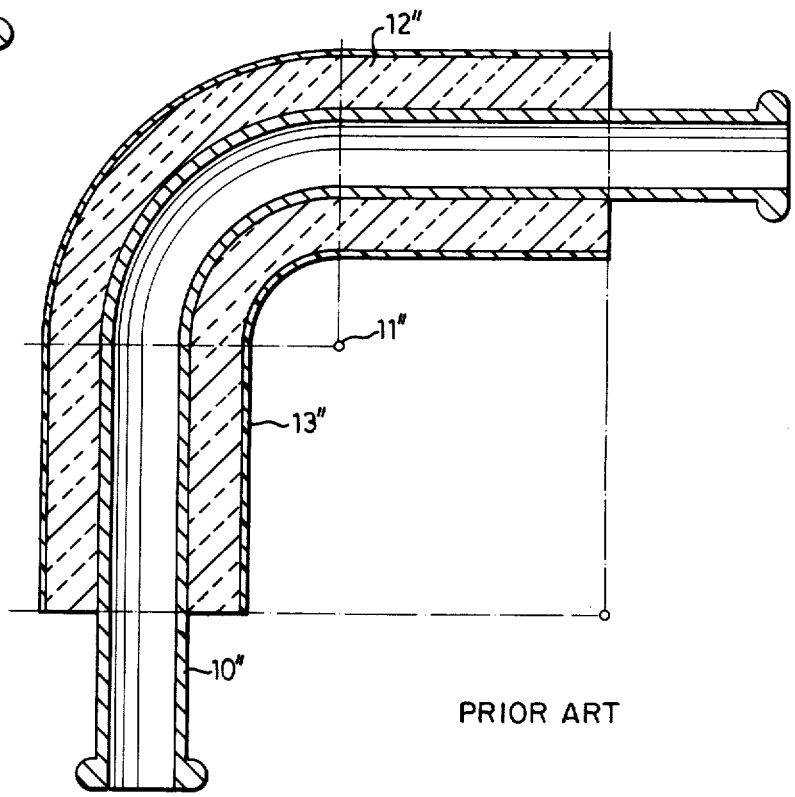

In FIGS. 1 and 2, two prior art pipe bends 10' and 10'' are shown depicting the extreme cases among different curvature radii which may exist in pipe bends for the same pipe dimension. The pipe bend according to FIG. 1 thus has an essentially greater curvature radius, determined by center 11', whereby the pipe bend according to FIG. 2 has an essentially smaller curvature radius determined by the curvature center 11''. In both cases, the pipe bend is provided with an insulation, made from, for instance, mineral wool, 12', 12'', and with a conventional protection cover 13', 13'', respectively.

It is immediately evident from the two figures that for all intermediate curvature radii between the ones indicated in FIG. 1 and FIG. 2, protection covers of different kind must exist. In this connection, it should be mentioned that standardized pipe bends for certain greater pipe dimensions are based upon no less than five different curvature radii. FIG. 1 thereby represents the greatest one of these curvature radii, whereas FIG. 2 represents the smaller one. Between these two shown positions there are three further curvature radii. Thus, one would have to have access to no less than five different shapes for any one pipe dimension.

A feature of the present invention is that one protection cover is provided for a pipe bend, so that this protection cover may be applied both on the pipe bend shown in FIG. 1 and on the pipe bend shown in FIG. 2. In the installed position around the pipe bend inclusive of its insulation, therefore, the protection cover should have an outer generatrics curvature corresponding to the one shown in FIG. 2, but an inner generatrics circumference, corresponding to the one shown in FIG. 1. The consequence is that even if one should allow for certain interspaces between the protection cover, on the one side, and the insulation on the other side, one can have with one protection cover a cover to protect the insulation around each of the five different pipe bends mentioned above as an example which exists for the same pipe dimension.

As mentioned above, it is not possible to arrange the protection cover so that its free, comprehensive edges will, in the position of rest of the protection cover before the cover is applied to the pipe bend, be situated in the same plane. Therefore, the protection cover must be manufactured in two different steps, the first step under deep drawing and the second step under a cutting operation.

Figure 3:
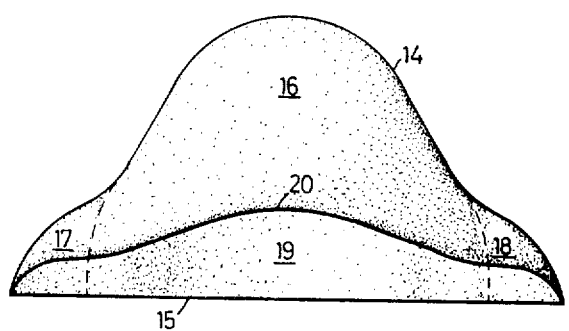
FIGS. 3, 4, and 5 show a blank, immediately after the deep drawing has been made, but before the cutting operation of an embodiment of a pipe bend protection cover in accordance with the present invention.

FIG. 3 shows a protection cover 14 in accordance with one embodiment of the present invention, seen perpendicularly to the longitudinal direction of the protection cover immediately after the deep drawing operation. The deep drawing thus has left a free edge 15 behind, which is situated in the same plane. Above this basic plane, a cup-formed or shaped part 16 and two tail sections or spiss gatt shaped parts 17 and 18 are located.

Figure 4:
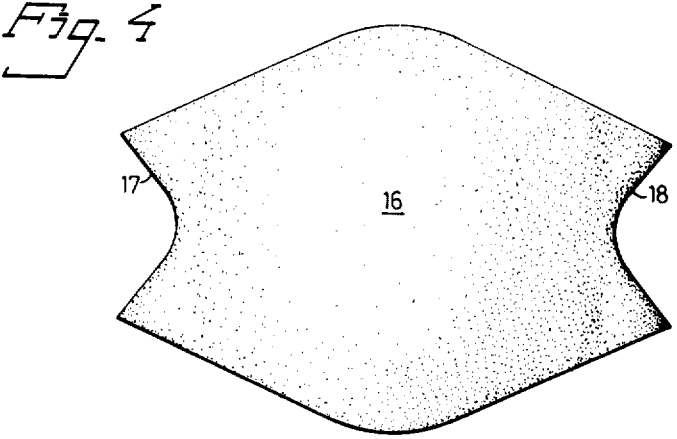
Figure 5:
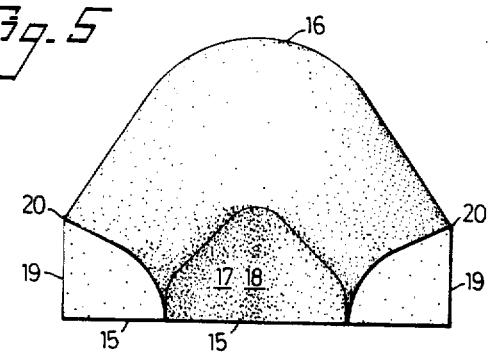

A cutting operation of the lower edge of the protection cover then takes place so that the protection cover shown in FIG. 3 becomes that shown in FIG. 6, the view shown in FIG. 4 becomes that shown in FIG. 7, and the view shown in FIG. 5 becomes that shown in FIG. 8. In practice, this means that the edge part 19 limited by the contour line 20 is cut away along the two exterior longitudinal sides of the protection cover. However, the lower edge of the tail sections 17 and 18 are left intact. Tail sections 17 and 18 therefore still have a free lower edge 21 situated in the same plane as plane 15 mentioned above. However, on the other side the longer sides of the protection cover are defined by an upwardly curved contour line 20.

When applying a protection cover according to the present invention to a pipe bend, one proceeds in such a way that the protection cover (as shown in FIG. 7) is placed against the exterior side of the pipe bend with the plane of the pipe bend in the vertical direction as shown in FIG. 7. The two tail sections 17 and 18 are thereafter forced around the pipe, and thereby they approach one another under resilient, snap action and assume the shape shown in FIG. 9. As shown in FIG. 9, the two tail sections 17 and 18 approach each other such that they meet along the inner generatrics line of the protection cover.

In the embodiment of the invention shown in FIGS. 3 through 10, the protection cover is enlarged with respect to the parts covering the pipe bend proper so that an overlap joint 22 is obtained along the line where the edges of the two tail sections 17 and 18 meet one another. This embodiment also provides elongations 23 which cover the usually straight connection parts and insulation at each end of the pipe bend.

The curvature centers have also been indicated in FIG. 10 in a manner similar to the curvature centers shown in schematic form in FIG. 1 and FIG. 2 at 11' and 11'', respectively.

Although a protection cover of the type concerned fits and is retained around a pipe bend by snap action in a satisfactory manner, it is nevertheless of value that one can further secure the two overlapping parts to each other at the overlapping joint 22. This can easily be accomplished either by bandaging or by applying tape covering the free, exterior edge of the overlap joint 22.

I claim:

1. An elongate protection cover for pipe bends, each such pipe bend defining a curvature plane and having an exterior side and an interior side; said cover comprised of a deformable material that has been deep drawn into a shape which is similar to the shape which could be obtained if an integral and complete cover installed on a pipe bend had been cut along the interior generatrics line of the pipe bend and spread apart and opened up, said cover before being installed on a pipe bend having longitudinal and transverse planes of symmetry and comprising a cup-shaped portion elongated along said longitudinal plane of said cover and having long sides and short sides, said cup-shaped part being rounded in transverse cross-section; and a tail section located at each short side of said cup-shaped part, each said tail section having a concave bend therein such that when said cover is applied to a pipe bend with said longitudinal plane of said cover perpendicular to the curvature plane of the pipe bend, each said tail section can be folded at least to an edge line located along the interior generatrics line of the pipe bend; said cup-shaped part having a first curvature radius in the transverse direction determining the curvature of said cover, when applied to a pipe bend, on the exterior side of the pipe bend; and said cover further having, when applied to the pipe bend, a second curvature radius determining the curvature of the cover on the interior side of the pipe bend, said first and second radii respectively having first and second mutually different centers, said first center being located closer to the exterior side of the pipe bend than said second center, said second curvature radius being greater than said first curvature radius; said two tail sections, before said cover is applied over the pipe bend, having the free edges thereof in the same plane, said same plane being perpendicular to both said transverse and longitudinal planes of said cover, and the connecting edges connecting said two tail sections and defining the lower edges of said long sides of said cup-shaped part being curved upward and above said same plane.

2. A protection cover as claimed in claim 1 wherein said cover is comprised of a resilient plastic material tending to retain the formed shape and, which when applied to the pipe bend, can be folded beyond a point whereupon under snap action, said cover assumes and retains a shape generally conforming to the pipe bend.

3. A protection cover for pipe bends according to claim 1, in which the tail sections have a length such that when the cover is applied over an insulated pipe, an overlap joint is formed between the corresponding edge parts of said tail sections.

4. A protection cover for pipe bends according to claim 1, in which said cup-formed part of said protection cover is extended so that when applied to a pipe bend said cover covers at least a part of the straight end parts of the pipe bend.

5. A protection cover for pipe bends according to claim 4, in which the tail sections have a length such that when the cover is applied over an insulated pipe, an overlap joint is formed between the corresponding edge parts of said tail sections.

* * * * *